Figures 1, 2, 3:
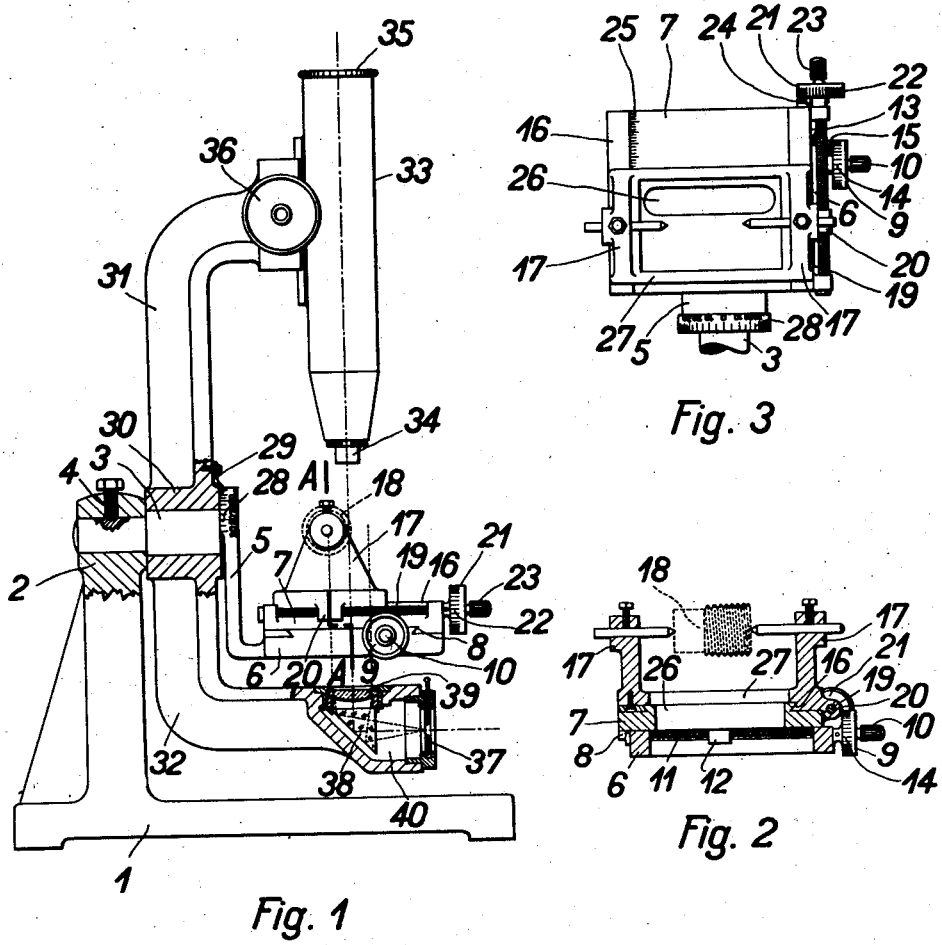

Feb. 7, 1933.  P. NICHTERLEIN  1,896,828
DEVICE FOR GAUGING BOLT THREADS
Filed April 22, 1930

Inventor:
Paul Nichterlein

Patented Feb. 7, 1933

1,896,828

UNITED STATES PATENT OFFICE

PAUL NICHTERLEIN, OF JENA, GERMANY, ASSIGNOR TO THE FIRM CARL ZEISS, OF JENA, GERMANY

DEVICE FOR GAUGING BOLT THREADS

Application filed April 22, 1930, Serial No. 446,295, and in Germany April 27, 1929.

I have filed an application in Germany, April 27, 1929.

When examining and gauging bolt threads by means of optical imaging appliances, the thread is appropriately illuminated in the well-known manner in such a way that the axes of the pencils of illuminating rays are inclined towards the axis of the thread by an angle that differs from 90° by the angle of inclination of the thread. If, like in most cases, the pencils of illuminating rays are not parallel to each other, it is convenient to let at least the axis of the pencil illuminating the centre of the field to be imaged have the said angle. Likewise the suggestion was made to incline to the axis of the thread by the same angle the axes of the pencils of imaging rays, which in most casses are parallel to each other, or at least the axis of the pencil of rays imaging the centre of the field of vision, so as to afford the best possible use of the imaging system by making the axis of the complete pencil of illuminating rays coincide with that of the complete pencil of imaging rays.

An instrument which comprises a device for holding the thread to be gauged, a device for illuminating the said thread, a microscope whose tube axis coincides with the axis of the pencil of illuminating rays, and a device for displacing the said thread in its axial direction and measuring these displacements, is already known. The displacing device of this instrument is disposed on a stage serving as a bearing and both, the displacing device and the stage, allow of being turned conjointly relatively to the illuminating device and the microscope on an axis lying in the focussing plane of the microscope, whereby the direction of displacement is parallel to the longitudinal axis of the fixed thread, regardless of the position of the latter. At the same time the bearing and the displacing device can be turned relatively to the illuminating system and the microscope on an axis perpendicularly intersecting the axis of the thread which is displaceable in axial direction, whereas the illuminating system and the microscope are fixed relatively to the surface supporting the instrument.

This construction has the following disadvantages. The pieces of work to be gauged are frequently set up in V-shaped bearings provided on the stage or are placed direct on a glass plate serving as stage. As soon as the bearing and the displacing device are inclined, the piece of work can easily slip off, namely, corresponding to the turning axis of the stage, in the measuring direction, and the consequence is incorrect measuring. Even when the pieces of work are set up between centres it has to be feared that the slide, which as a rule serves as displacing device, will slip off, which drawback cannot be obviated unobjectionably even when using a counter-spring. This spring, as is well known, must always have such dimensions that afford it to withstand the greatest possible load on the slide. However, when the slide is but slightly loaded, viz. when relatively small pieces of work have to be measured, the result is an undesired one-sided stress upon the measuring spindle used for displacing.

The invention obviates the aforementioned drawbacks and has for its object an instrument of the said kind, in which the illuminating system together with the microscope allow of being turned on a corresponding axis, whereas the displacing device is fixed relatively to the supporting surface for the instrument. The instrument can be constructed in such a way that it affords the observer to subjectively examine the field of vision in the microscope and also allows of projecting the microscopic image on a projection surface.

In the accompanying drawing, which illustrates the invention, a constructional example is given of an instrument for gauging bolt threads in the said subjective use. Figure 1 is an elevational and partly a central section through the instrument, Figure 2 the side elevation of a partial section along line A—A in Figure 1, and Figure 3 a diagram of the part shown by Figure 2.

The instrument has a foot 1 with a bearing 2. By means of a pointed screw 4 a bolt 3 is fixed in this bearing 2. The bolt 3 is provided with a carrier 5 attaching to a frame-like stage 6. On the stage 6 is provided a slide 7 which is displaceable on a slide guide 8. The displacement is effected by means of a knob 10 provided with a wheel 9 which, through the agency of a spindle 11 rotatably disposed in the stage 6, acts on a nut piece 12 fast with the slide. For measuring the displacements, the stage 6 has a scale 13 and the wheel 9 a scale 14 to which belongs an index 15 provided on the stage 6. The slide 7 moves in a slide guide 16 disposed at right angles to the slide guide 8. For holding the bolt thread to be gauged, 18, the slide guide 16 carries a fixing device 17 which allows of being displaced by means of a spindle 19 provided in the stage 7 and acting on a nut piece 20 fast with the fixing device 17. The spindle 19 is provided with a wheel 21 having a scale 22 and a knob 23. To the scale 22 belongs an index 24 fixed to the slide 7 which is provided also with a scale 25. The slide 7 has a longitudinal aperture 26 extending in the direction of displacement of the stage 6, and, owing to the frame-like construction of its base plate 27, the fixing device 17 allows the passage of light over the greater part of its surface. An angular graduation 28 on the carrier 5, which coacts with an index 29, serves for adjusting the stage 6 in an inclined position.

The bolt 3 goes through a nave 30 which turns on it and carries the index 29. By means of arms 31 and 32, respectively, the nave 30 is rigidly connected with a microscope tube having an objective 34 and an eyepiece 35, which permits of being adjusted in the well known manner by means of a milled head 36, and with an illuminating device projecting from below a pencil of parallel rays into the objective 34. The illuminating device consists of an iris diaphragm 37, a rectangular isosceles reflecting prism 38 and a converging lens 39 the focal plane of which corresponds to the plane of the iris diaphragm 39. The optical parts 37, 38, and 39 are provided in a casing 40 at the end of the arm 32 in such a manner that the optical axis of the lens 39 coincides with the axis of the tube 33.

The bolt thread to be gauged, 18, is set up in the fixing device 17 in the manner explained in the drawing. Hereupon the bolt 18 is given the position required for gauging by displacing the cross slides 7, 16 by means of the heads 10 and 23, and the angle of inclination of the thread 18 is adjusted on the graduation 28 by means of the index 29, for which purpose the arms 31, 32 have to be turned on the bolt 3. Now, when displacing in the slide guide 8 the fixing device 17 by means of the head 10 so long until the position of the image of a thread hob coincides in the field of vision of the microscope 33, 34, 35 with the point that previously was in line with the image of the adjacent hob (or, in case of double or multiplex threads, the next but one, etc.), the said displacement corresponds to the pitch of the thread 18. The edge of the slide 7 and the scale 13 allow of taking a coarse reading of the value of the said pitch, while the index 15 permits a fine reading on the scale 14 of the wheel 9. The diameters of the bolt are found in a corresponding manner, coarsely by reading that line of the scale 25 which is indicated by the edge of the base plate 27, and finely by reading that line of the scale 22 on the wheel 21 which the index 24 points to.

Those parts of the instrument which are connected with the carrier 5, viz. the displacing and the fixing device, are not movable relatively to the surface supporting the apparatus, which is given by the feet. Instead of a fixing device 17 a simple plano-parallel glass plate may be placed on the slide guide 7, especially in the case of relatively small work pieces 18. The iris diaphragm 37 is an aperture diaphragm for the pencil of illuminating rays. The mount of the converging lens 39 restricts the diameter of the pencil of illuminating rays and, consequently, acts as a diaphragm for the field of vision. In order to provide further reduction in the size of the field of vision a suitable diaphragm may be placed on the said mount. Naturally also an artificial source of light may be taken as an illuminant.

I claim:

An instrument for gauging bolt threads, comprising a stand, a fixing device for supporting the thread to be gauged, a device for illuminating the said thread, a microscope whose tube axis coincides with the axis of the pencil of illuminating rays, a device for displacing the thread to be gauged and for measuring the displacements, and a pivot, this pivot, the fixing device and the displacing device being rigidly connected with the stand, the illuminating device and the microscope being rigidly connected to each other and supported on the pivot for conjoint rotation about the pivot, the axis of the pivot lying in the focussing plane of the microscope, and the direction of displacement being parallel to the longitudinal axis of the thread on the fixing device, regardless of the positions of the microscope and the illuminating device.

PAUL NICHTERLEIN.